United States Patent
Kim et al.

(10) Patent No.: US 9,356,840 B2
(45) Date of Patent: May 31, 2016

(54) APPARATUS AND METHOD FOR PARAMETER ROLLBACK IN A SELF CONFIGURABLE BROADBAND WIRELESS COMMUNICATION SYSTEM

(75) Inventors: Kwang-Sik Kim, Suwon-si (KR);
Hyon-Goo Kang, Suwon-si (KR);
Jeong-Dae Kim, Yongin-si (KR);
Jin-Kwan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2038 days.

(21) Appl. No.: 12/157,826

(22) Filed: Jun. 13, 2008

(65) Prior Publication Data
US 2008/0310320 A1 Dec. 18, 2008

(30) Foreign Application Priority Data
Jun. 14, 2007 (KR) .............................. 2007-0058218

(51) Int. Cl.
*H04L 12/24* (2006.01)

(52) U.S. Cl.
CPC ........ *H04L 41/5022* (2013.01); *H04L 41/0863* (2013.01); *H04L 41/0823* (2013.01)

(58) Field of Classification Search
CPC ............ H04L 41/0823; H04L 41/0863; H04L 41/5022
USPC .......... 370/352, 252, 328; 455/445, 423, 434, 455/450
See application file for complete search history.

(56) References Cited

U.S. PATENT DOCUMENTS

| | | | |
|---|---|---|---|
| 6,577,875 B1* | 6/2003 | Brouwer ...................... | 455/522 |
| 6,721,568 B1* | 4/2004 | Gustavsson et al. .......... | 455/450 |
| 6,795,823 B1* | 9/2004 | Aklepi .................... | G06Q 10/08 707/781 |
| 2003/0003906 A1* | 1/2003 | Demers ................ | H04B 1/7107 455/424 |
| 2003/0222818 A1* | 12/2003 | Regnier et al. ................ | 342/383 |
| 2007/0248080 A1* | 10/2007 | Nesargi .............. | H04L 12/5695 370/352 |
| 2007/0263585 A1* | 11/2007 | Duan .................... | H04W 28/02 370/342 |
| 2008/0013470 A1* | 1/2008 | Kopplin ........................ | 370/310 |
| 2008/0026773 A1* | 1/2008 | Hyun .................... | H04W 64/00 455/456.1 |
| 2008/0070580 A1* | 3/2008 | Menich ................. | H04W 24/02 455/446 |

FOREIGN PATENT DOCUMENTS

KR 1020020053401 A 7/2002

OTHER PUBLICATIONS

Office Action dated Jan. 11, 2010 in connection with Korean Patent Application No. 10-2007-0058218.

* cited by examiner

*Primary Examiner* — Khaled Kassim

(57) ABSTRACT

An apparatus and method for rolling back operation parameters of a base station in a self-configurable broadband wireless communication system are provided, in which in a manager server, an optimizer for determining optimized operation parameters of the base station based on information which is needed to optimize and is received from the base station, an evaluator for calculating service level of the base station using the optimized operation parameters, and a controller for requesting to roll back the optimized operation parameters when the service level is greater than or equal to a first threshold value.

22 Claims, 5 Drawing Sheets

APPARATUS AND METHOD FOR PARAMETER ROLLBACK IN A SELF CONFIGURABLE BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 14, 2007 and assigned Serial No. 2007-0058218, the entire disclosure of which is hereby incorporated by reference.

TECHNICAL FIELD OF THE INVENTION

The present invention generally relates to a broadband wireless communication system. More particularly, the present invention relates to an apparatus and method for solving the problem owing to using wrong operation parameters in a self-configurable broadband wireless communication system.

BACKGROUND OF THE INVENTION

Generally, a system operator has to analyze information on a base station (BS) to be installed and information on other base stations located nearby the BS to be installed, when the BS is installed additionally in a broadband wireless communication. Then, the system operator could determine operation parameters adapted to the BS to be installed based on analyzed information. Therefore, the BS would be operated according to parameters which are determined by the system operator.

That is, when a BS is installed or removed, the system operator has to determine operation parameters of the BS by himself. If a BS is installed or removed frequently, the system operator may spend more time and effort to determine operation parameters. So, to save the system operator's trouble and be easy to install and remove a BS, a self-configurable wireless communication system is being studied and developed.

In a self-configurable wireless communication system, a BS to be installed can get optimized operation parameters by itself through an optimization algorithm provided from the system. As a result of that, the system operator would optimize whole system without his own effort. But, after the optimization algorithm is performed, unexpected factors (e.g., radio wave interference, system alarm, etc.) could be generated. At this time, besides the BS newly installed, other base stations may suffer from decreasing capability or service interruption. Hence, it is required that a solution be found for problems due to errors during the optimization algorithm, decreasing capability or radio environment change.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for solving immediately unexpected problems owing to environment change at initialization in a self-configurable broadband wireless communication system.

Another aspect of exemplary embodiments of the present invention provides an apparatus and method for managing operation parameters of a base station (BS) according to the environment change in a self-configurable broadband wireless communication system.

A further aspect of exemplary embodiments of the present invention provides an apparatus and method for rolling back operation parameters of a base station having low performance in a self-configurable broadband wireless communication system.

In accordance with an aspect of exemplary embodiments of the present invention, an apparatus of a base station in a self-configurable broadband wireless communication system includes: an optimizer for determining optimized operation parameters of a base station based on information which is needed to optimize and is received from the base station, an evaluator for calculating service level of the base station using the optimized operation parameters, and a controller for requesting to roll back the optimized operation parameters when the service level is greater than or equal to the first threshold value.

In accordance with another aspect of exemplary embodiments of the present invention, an apparatus of a base station in a self-configurable broadband wireless communication system includes: an Operator And Manager (OAM) for transmitting information which is needed to optimize to a manager server, and optimizing operation parameters by controlling operation according to optimized operation parameters received from the manager server, and a monitor for reporting performance metrics of the base station to the manager server, and rolling back the optimized operation parameters according to the request of the manager server.

In accordance with another aspect of exemplary embodiments of the present invention, a method for managing operation parameters in a manager server in a wireless communication system includes: determining optimized operation parameters of a base station based on information which is needed to optimize and is received from the base station, calculating service level of the base station using the optimized operation parameters; and requesting to roll back the optimized operation parameters when the service level is greater than or equal to the first threshold value.

In accordance with another aspect of exemplary embodiments of the present invention, a method for managing operation parameters in a base station in a wireless communication system includes: transmitting information which is needed to optimize to a manager server, optimizing operation parameters by controlling operation according to optimized operation parameters received from the manager server, reporting performance metrics of the base station to the manager server, and rolling back the optimized operation parameters according to the request of the manager server.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for rolling back operation parameters of a base station (BS) in a self-configurable broadband wireless communication system. While the exemplary embodiments of the present invention are described in the context of an OFDM wireless communication system, it is to be clearly understood that they are also applicable to other wireless communication systems.

A description will first be made of a schematic construction of a broadband wireless communication system according to the present invention by referring to FIG. 1.

Figure 1:
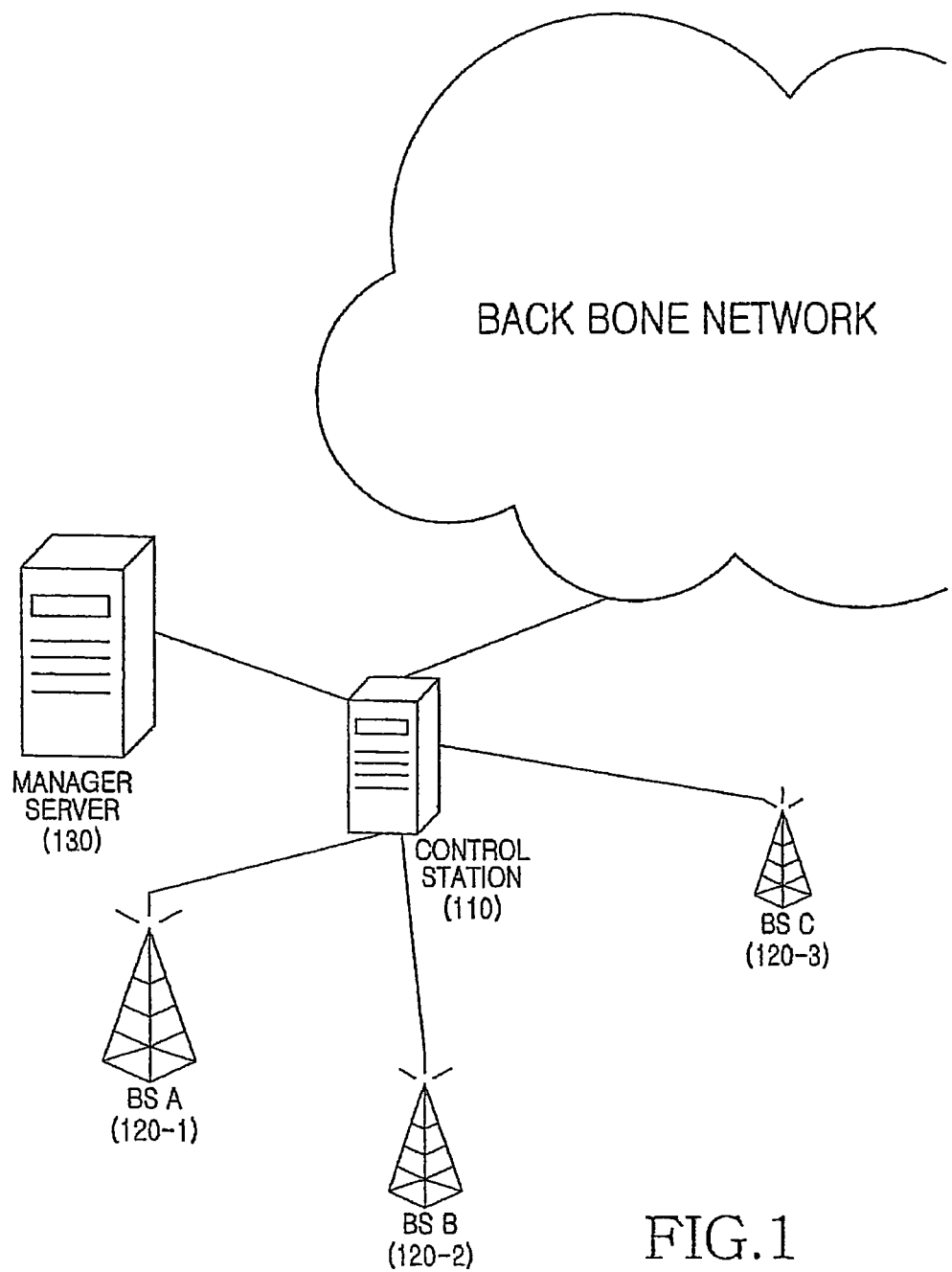
FIG. 1 is a diagram illustrating a schematic construction of a broadband wireless communication system according to the present invention.

Referring to FIG. 1, the broadband wireless communication system according to the present invention includes a control station 110, a plurality of base stations 120-1 to 120-3, a manager server 130. Wherein, other control stations and other manager servers could be included in the broadband wireless communication system according to the present invention beside the control station 110 and the manager server 130.

The control station 110 is in charge of a gateway of a subnet comprising a plurality of base stations 120-1 to 120-3 and controls back-bone network access of a plurality of base stations 120-1 to 120-3. A plurality of base stations 120-1 to 120-3 perform wireless communication with Mobile Terminals (MTs) through wireless channels. Wherein, all of a plurality of base stations 120-1 to 120-3 or a part of a plurality of base stations 120-1 to 120-3 might have a self-configurable function. Hereinafter, it is assumed that the BS_A 120-1 has the self-configurable function.

The manager sever 130 is a remote access server which is to manage network equipments of the network provider. For example, the manager server 130 takes charge of dealing with operational error of BS and control station and changing operation parameters. And, the manager server 130 performs optimization on a self-configurable BS. More specifically, the manager server 130 determines operation parameters (e.g., frequency allocation, cell identifier, transmitting power, etc.) of a BS to be installed based on system information such as distribution of other base stations, when a installation of the BS is recognized.

That is, the BS_A 120-1 gathers information that is needed to optimize at initialization, and provides the manager server 130 with the information. For example, the information that is needed to optimize includes at least one of received signal strength from neighbor base stations and installation location. Then, the BS_A 120-1 performs wireless communication according to the operation parameters provided from the manager server 130.

Meanwhile, the BS_A 120-1 monitors its own performance. This is, to decide whether the operation parameters are optimized or not, the BS_A 120-1 continuously estimates its own performance metrics and reports a result of estimation to the manager server 130. For example, the performance metrics include at least one of average throughput, downlink Carrier to Interference and Noise Ratio (CINR), system alarm and received signal strength from neighbor base stations.

The manager server 130 calculates service level of the BS_A 120-1 based on the performance metrics from the BS_A 120-1 and other base stations located near by the BS_A 120-1. For example, the service level is calculated as a sum of values at each item described in Table 1 below.

TABLE 1

|  | SC-BS throughput | NBR-BS throughput | SC-BS Avg CINR | SC-BS alarm | NBR-BS alarm |
|---|---|---|---|---|---|
| Critical status (value = 2) | $C_1$ % | $C_2$ % | $C_3$ % | critical alarm list | critical alarm list |
| Reestimated states (value = 1) | $M_1$ % | $M_2$ % | $M_3$ % | minor alarm list | minor alarm list |

In Table 1, 'SC-BS' denotes Self-Configurable BS (SC-BS), 'NBR-BS' denotes NeighBoR BS (NBR-BS) and 'Avg CINR' denotes Average CINR (Avg CINR).

In Table 1, the $C_k$ is smaller than the Mk (k=1, 2, 3). The critical alarm list includes alarms which are critical for system operation. The minor alarm list includes alarms which have to be dealt with but are not critical. The throughput is not instantaneous throughput but is average throughput under the condition that all radio resources are used. If a BS uses a part of whole resources because few MTs connect the BS, throughput of the BS may be estimated lower. So, it is reasonable that average throughput as performance estimation is calculated under the condition that all radio resources are used. And, Avg CINR is estimated by using downlink signal.

The manager server 130 checks values of each item for the BS_A 120-1 according to the Table 1 and calculates the service level by summing values for the BS_A 120-1. Meanwhile, the manager server 130 can control the contribution rate of each item by giving weights to each item based on the priority order. Then, the manager server 130 decides whether to roll back the operation parameters or not according to the service level. For example, the decision is performed according to Table 2 below.

TABLE 2

| Range of Service Level | Process |
| --- | --- |
| service level ≥ critical level | parameters roll back |
| critical level > service level ≥ reestimated level | re-optimization |
| reestimated level > service level | parameters maintenance |

In Table 2, the critical level is set bigger than the reestimated level.

Briefly, the manager server 130 calculates the service level of the BS_A 120-1 according to the Table 1, and determines process to deal with present operation parameters according to the Table 2. Then, the manager server 130 makes the BS_A 120-1 sustain optimized status by rolling back the previous operation parameters or default operation parameters, performing optimization algorithm again or maintaining the present operation parameters according to the process determined.

Now a description will be made of the configuration and operation of the manager server and BS based on the above description.

Figure 2:
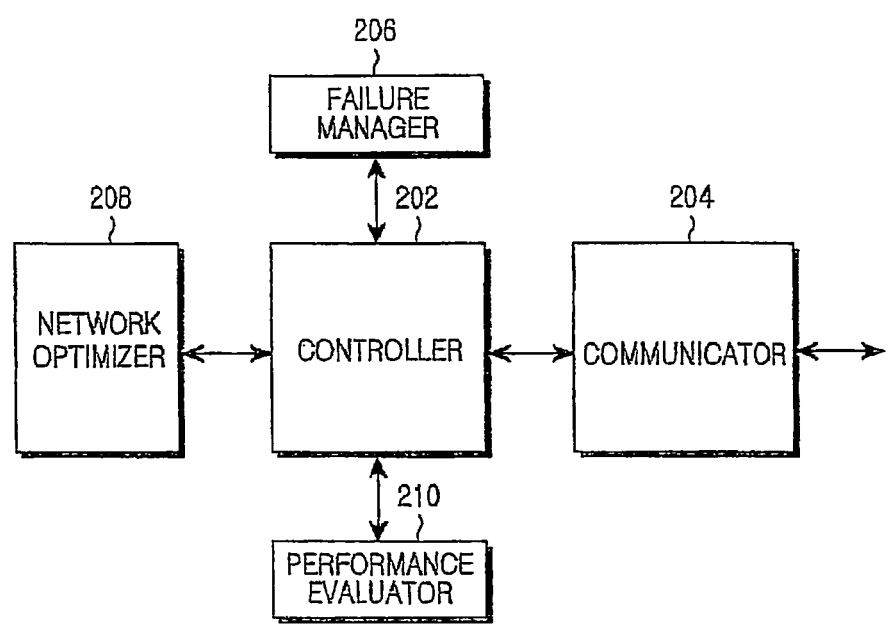
FIG. 2 is a block diagram of a manager server in a broadband wireless communication system according to the present invention.

FIG. 2 is a block diagram of a manager server in a broadband wireless communication system according to the present invention.

Referring to FIG. 2, the manager server includes a controller 202, a communicator 204, a failure manager 206, a network optimizer 208, and a performance evaluator 210.

The controller 202 controls overall functions of the manager server. For example, the controller 202 provides the network optimizer 208 with information which is needed to optimize when the information is received from a BS and control the network optimizer 208 to determine operation parameters for the BS. And, the controller 202 gathers information which is needed to calculate service level of the BS. The controller 202 provides the performance evaluator 210 with the information which is needed to calculate the service level, and controls the performance evaluator 210 to calculate the service level and to determine whether to roll back the operation parameters or not.

The communicator 204 performs a signal processing function to exchange information with base stations. The failure manager 206 detects the operational error occurred at BS or control station and deals with the operational error. The network optimizer 208 determines optimized operation parameters (e.g., frequency allocation, cell identifier, transmitting power, etc.) of the BS based on location of the BS and received signal strength from neighbor base stations.

The performance evaluator 210 calculates the service level of the BS that is optimized and is under operation, and determines process to deal with present operation parameters according to the service level. For example, the process to deal with present operation parameters is one of rolling back the operation parameters, performing optimization algorithm again and maintaining the present operation parameters. That is, the performance evaluator 210 calculates the service level according to the Table 1 above, and determines process to deal with present operation parameters according to the Table 2 above. In the case of rolling back operation parameters, operation parameters restored because of rolling back are previous operation parameters or default operation parameters.

Figure 3:
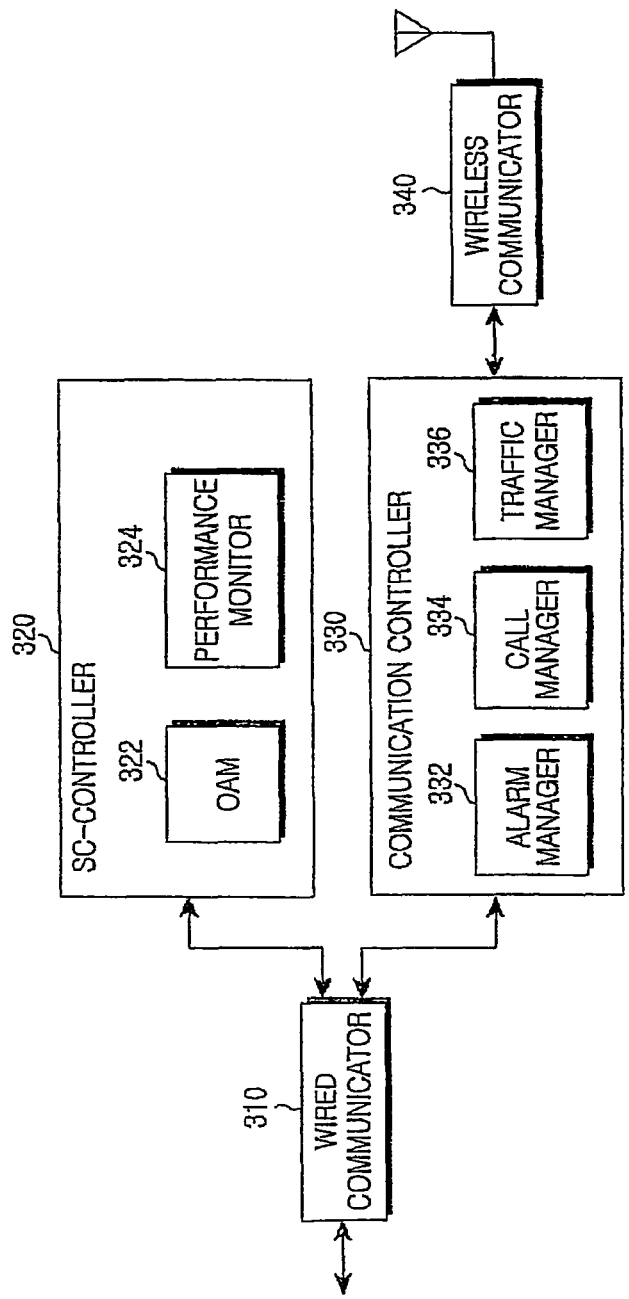
FIG. 3 is a block diagram of a BS in a broadband wireless communication system according to the present invention.

FIG. 3 is a block diagram of a BS in a broadband wireless communication system according to the present invention.

Referring to FIG. 3, the BS includes a wired communicator 310, a Self-Configurable controller (SC-controller) 320, a communication controller 330, and a wireless communicator 340.

The wired communicator 310 performs a signal processing function to exchange information with a manager server. The SC-controller 320 performs a self-configurable function, in other words, a function to obtain operation parameters optimized for the network. The communication controller 330 performs a function to communicate with MTs. The wireless communicator 340 performs a signal processing function to communicate with a manager the MTs through a wireless channel. For example, in the case of downlink communication, the wireless communicator 340 generates complex symbols by encoding and modulating bit streams, and generates OFDM symbols through Inverse Fast Fourier Transform (IFFT) operation. Then, the wireless communicator 340 amplifies and up-converts the OFDM symbols, and transmits the up-converted OFDM symbols though an antenna. Additionally, the wireless communicator 340 measures received signal strength from neighbor base stations at optimization setting mode. The received signal strength is provided to the SC-controller 320.

The SC-controller 320 includes an Operator And Manager (OAM) 322 and a performance monitor 324. The OAM 322 performs a function to manage operation parameters for self-configuration. Particularly, at the optimization setting mode, the OAM 322 performs a function to gather information which is needed to optimize and to transmit the information. Wherein, the optimization setting mode is activated when the BS is installed, when a request by the manager server occurs and when an operation by a user occurs. For example, the information which is needed to optimize is at least one of received signal strength from neighbor base stations and installation location. And, the OAM 322 provides the communication controller 330 with the optimized operation parameters received from the manager server. For example, the operation parameters include at least one of frequency allocation, cell identifier and transmitting power.

The performance monitor 324 performs a function to preserve the operation parameters on optimized status. Specifically, the performance monitor 324 gathers performance metrics to decide whether present operation parameters are optimized or not, and transmits the performance metrics to the manager server. For example, the performance metrics include at least one of average throughput, downlink CINR, system alarm and received signal strength from neighbor base stations. And, the performance monitor 324 rolls back the operation parameters or triggers optimization procedure of the OAM 322 under the direction of the manager server. Wherein, operation parameters restored because of rolling back are previous operation parameters or default operation parameters.

The communication controller 330 includes an alarm manager 332, a call manager 334, and a traffic manager 336. The alarm manager 332 detects alarms and operational errors that occur while the BS is under operation. And, the alarm manager 332 provides the SC-controller 320 with alarm information that occurs. The call manager 334 performs a function for signaling such as generating and reading control messages to establish calls with the MTs. The traffic manager 336 performs a function to exchange the traffic data with the MTs. Particularly, the traffic manager 336 measures throughput and provides the SC-controller 320 with the throughput information.

Figure 4:
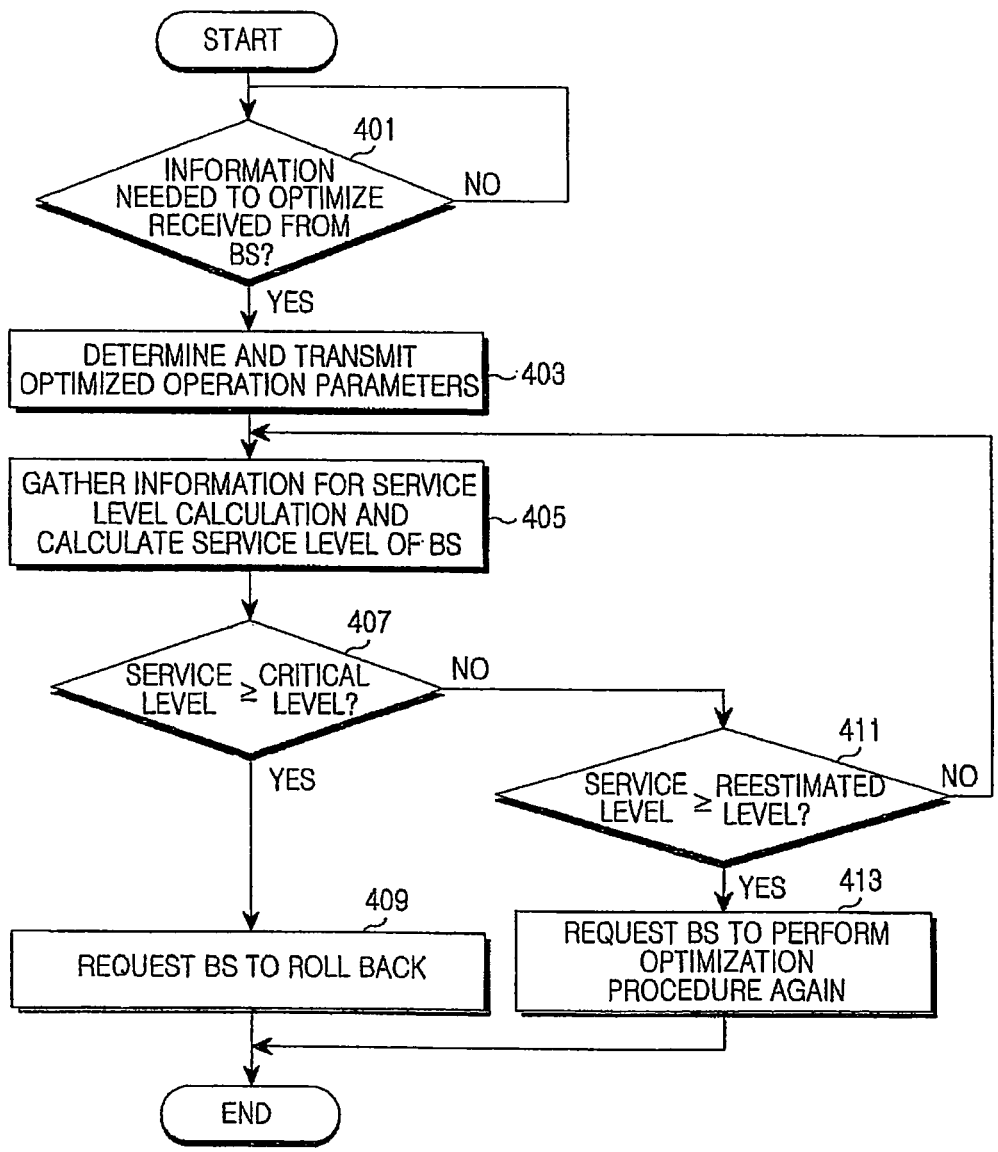
FIG. 4 is a flowchart of an operation for controlling operation parameters roll back at the manager server in the broadband wireless communication system according to an exemplary embodiment of the present invention.

FIG. 4 is a flowchart of an operation for controlling operation parameters roll back at the manager server in the broadband wireless communication system according to an exemplary embodiment of the present invention.

Referring to FIG. 4, the manager server monitors reception of information which is needed to optimize operation parameters of a BS in step 401. For example, the information which is needed to optimize includes at least one of received signal strength from neighbor base stations and installation location.

Upon receipt of the information from the BS, the manager server determines operation parameters for the BS and transmits the operation parameters to the BS in step 403. For example, the operation parameters include at least one of frequency allocation, cell identifier and transmitting power.

Then, the manager server gathers information to calculate service level of the BS and calculates the service level in step 405. Wherein, the information means performance metrics of the BS and neighbor base stations. For example, the performance metrics are evaluated variables about items described the Table 1 above. Then the manager server checks values corresponding ranges in which performance metrics belong about each item, and sums the values of each item to calculate the service level. Meanwhile, the manager server weights the each item differently when the evaluator sums the values.

After calculating the service level, the manager server compares the service level with the critical level in step 407. Wherein, the critical level is a value determined by system setting.

When the service level is greater than or equal to the critical level, the manager server requests the BS to roll back the operation parameters in step 409.

By contrast, when the service level is less than the critical level, the manager server compares the service level with reestimated level in step 411.

When the service level is greater than or equal to the reestimated level, the manager server request the BS to perform optimization procedure again in step 413.

Figure 5:
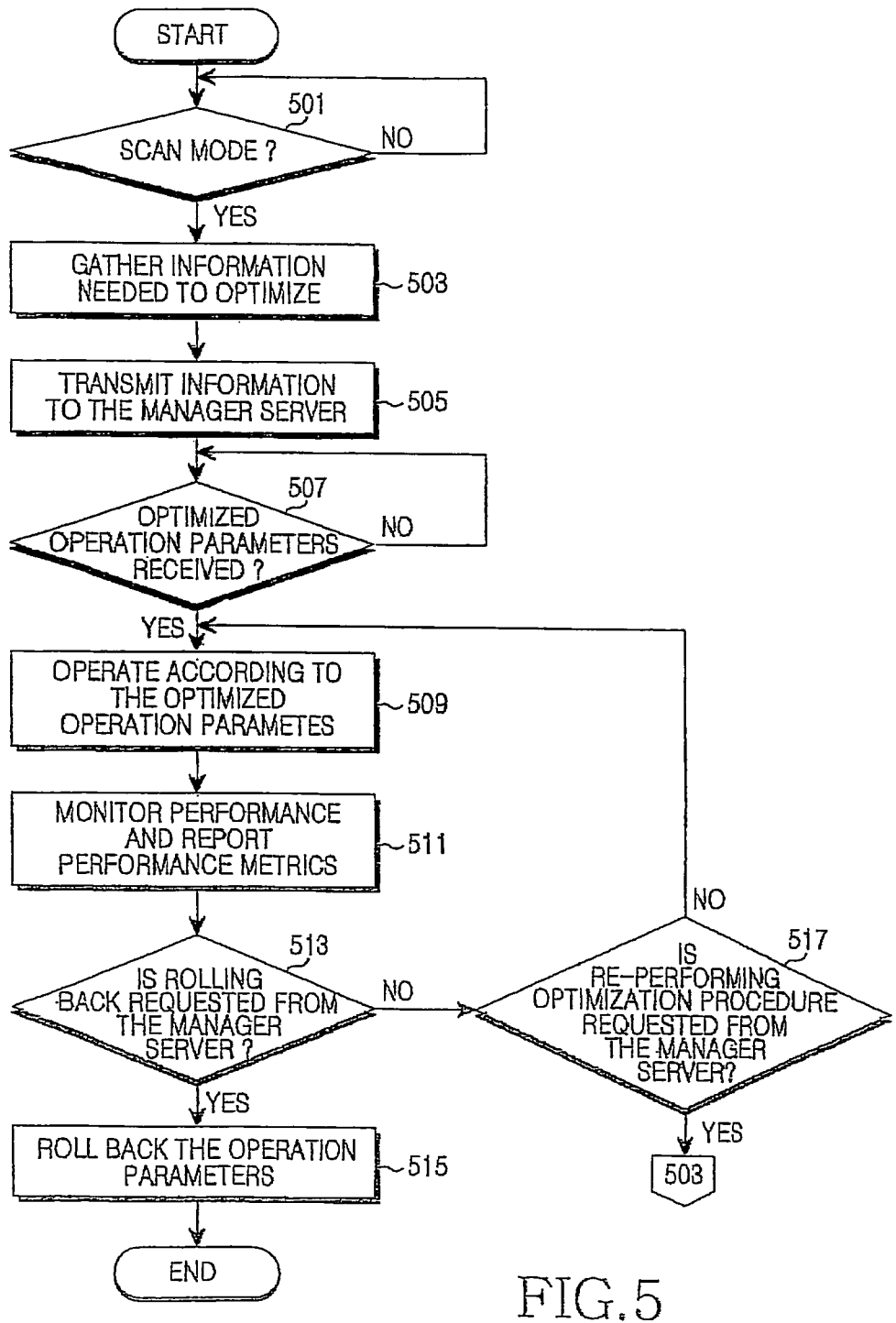
FIG. 5 is a flowchart of an operation for rolling back operation parameters at the BS in the broadband wireless communication system according to an exemplary embodiment of the present invention.

FIG. 5 is a flowchart of an operation for rolling back operation parameters at the BS in the broadband wireless communication system according to an exemplary embodiment of the present invention.

Referring FIG. 5, the BS checks to be at scan mode to scan neighbor base stations in step 501. That is, the BS checks whether optimization setting mode is activated. For example, the optimization setting mode is activated when the BS is installed, when a request by the manager server occurs and when an operation by a user occurs.

When the BS is at the operation setting mode, the BS gathers information which is needed to optimize in step 503. For example, the information which is needed to optimize includes at least one of received signal strength from neighbor base stations and installation location.

After gathering the information, the BS transmits the information gathered to the manager server in step 505.

Then, the BS monitors reception of optimized operation parameters from the manager server in step 507. For example, the operation parameters include at least one of frequency allocation, cell identifier and transmitting power.

When the optimized operation parameters are received from the manager server, the BS operates according to the optimized operation parameters in step 509. That is, the BS communicates with MTs according to the optimized operation parameters.

In step 511, the BS monitors its own performance and reports performance metrics to the manager server. For example, the performance metrics include at least one of average throughput, downlink CINR, system alarm and received signal strength from neighbor base stations.

After reporting the performance metrics, the BS checks whether rolling back the operation parameters is requested in step 513.

When rolling back the operation parameter is requested, the BS rolls back the operation parameter in step 515. Wherein, operation parameters restored because of rolling back are previous operation parameters or default operation parameters.

By contrast, when rolling back the operation parameters is not requested, the BS checks whether it is requested that the optimization procedure is performed again in step 517.

When re-performing the optimization procedure is requested, the BS returns the step 503 and performs the optimization procedure. But, when re-performing the optimization procedure is not requested, the BS returns to step 509 and communicates with MTs.

As is apparent from the above description, the present invention rolls back the operation parameters in a self-configurable broadband wireless communication system. Therefore, the problems and performance deterioration that occur during optimization are solved, and the system can deal with problems due to environment change.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a network manager server in a wireless communication system, the apparatus comprising:
    an optimizer configured to determine optimized operation parameters of a base station based on information needed to optimize that is received from the base station, wherein the optimized operation parameters include at least one of frequency allocation and cell identifier;
    an evaluator configured to calculate a service level of the base station using the optimized operation parameters; and
    a controller configured to request to roll back the optimized operation parameters of the base station when the service level is greater than or equal to a first threshold value, and to request the base station to perform an optimization procedure again when the service level is less than the first threshold value and the service level is greater than or equal to a second threshold value,
    wherein the optimized operation parameters of the base station are restored to previous operation parameters or default operation parameters.

2. The apparatus of claim 1, wherein the evaluator is configured to calculate the service level using a performance metric about at least one item in a list of items including average throughput of the base station, Carrier to Interference and Noise Ratio (CINR) of the base station, a system alarm that occurred from the base station, a system alarm that occurred from neighbor base stations of the base station, and a received signal strength from the neighbor base stations.

3. The apparatus of claim 2, wherein the evaluator is configured to check values corresponding to ranges of performance metrics about each of the items in the list, and sum the values of each of the items in the list to calculate the service level.

4. The apparatus of claim 3, wherein the evaluator is configured to weight each of the items in the list differently when summing the values.

5. The apparatus of claim 1, wherein the information needed to optimize includes at least one of a received signal strength from neighbor base stations of the base station and an installation location of the base station.

6. The apparatus of claim 1, wherein the optimized operation parameters of the base station further include transmitting power.

7. An apparatus of a base station in a wireless communication system, the apparatus comprising:
an Operator And Manager (OAM) configured to transmit information needed to optimize to a manager server, and optimize operation parameters of the base station by controlling operation according to optimized operation parameters received from the manager server, wherein the optimized operation parameters include at least one of frequency allocation and cell identifier; and
a monitor configured to report performance metrics of the base station to the manager server, and roll back the optimized operation parameters of the base station according to a request of the manager server when a service level calculated using the optimized operation parameters is greater than or equal to a first threshold value,
wherein the OAM is configured to perform an optimization procedure again according to a request received from the manager server when the service level is less than the first threshold value and the service level is greater than or equal to a second threshold value, and
wherein the optimized operation parameters of the base station are restored to previous operation parameters or default operation parameters.

8. The apparatus of claim 7, wherein the optimized operation parameters of the base station further include transmitting power.

9. The apparatus of claim 7, wherein the performance metrics include at least one of average throughput of the base station, downlink Carrier to Interference and Noise Ratio (CINR) of the base station, a system alarm that occurred from the base station and a received signal strength from neighbor base stations of the base station.

10. The apparatus of claim 7, wherein the monitor is configured to roll back present operation parameters to one of previous operation parameters and default operation parameters.

11. The apparatus of claim 7, wherein the information needed to optimize includes at least one of a received signal strength from neighbor base stations of the base station and an installation location of the base station.

12. A method for managing operation parameters in a manager server in a wireless communication system, the method comprising:
determining optimized operation parameters of a Base Station (BS) based on information needed to optimize that is received from the base station, wherein the optimized operation parameters include at least one of frequency allocation and cell identifier;
calculating a service level of the base station using the optimized operation parameters;
requesting to roll back the optimized operation parameters of the base station when the service level is greater than or equal to a first threshold value; and
requesting the base station to perform an optimization procedure again when the service level is less than the first threshold value and the service level is greater than or equal to a second threshold value,
wherein the optimized operation parameters of the base station are restored to previous operation parameters or default operation parameters.

13. The method of claim 12, wherein the service level is calculated using a performance metric about at least one item in a list of items including average throughput of the base station, Carrier to Interference and Noise Ratio (CINR) of the base station, a system alarm that occurred from the base station, a system alarm that occurred from neighbor base stations of the base station and a received signal strength from the neighbor base stations.

14. The method of claim 13, wherein calculating the service level comprises:
checking values corresponding to ranges of performance metrics about each of the items in the list; and
summing the values of each of the items in the list to calculate the service level.

15. The method of claim 14, further comprising:
weighting each of the items in the list differently when the manager server sums the values.

16. The method of claim 12, wherein the information needed to optimize includes at least one of a received signal strength from neighbor base stations of the base station and an installation location of the base station.

17. The method of claim 12, wherein the optimized operation parameters of the base station further include transmitting power.

18. A method for managing operation parameters in a base station in a wireless communication system, the method comprising:
transmitting information needed to optimize to a manager server;
optimizing operation parameters by controlling operation according to optimized operation parameters of the base station received from the manager server, wherein the optimized operation parameters include at least one of frequency allocation and cell identifier;
reporting performance metrics of the base station to the manager server;
rolling back the optimized operation parameters of the base station according to a request of the manager server when a service level calculated using the optimized operation parameters is greater than or equal to a first threshold value; and
performing an optimization procedure again according to a request received from the manager server when the service level is less than the first threshold value and the service level is greater than or equal to a second threshold value,
wherein the optimized operation parameters of the base station are restored to previous operation parameters or default operation parameters.

19. The method of claim 18, wherein the optimized operation parameters of the base station further include transmitting power.

20. The method of claim 18, wherein the performance metrics include at least one of average throughput of the base station, downlink Carrier to Interference and Noise Ratio (CINR) of the base station, a system alarm that occurred from the base station and a received signal strength from neighbor base stations of the base station.

21. The method of claim 18, wherein rolling back comprises:
rolling back present operation parameters to one of a previous operation parameters and default operation parameters.

22. The method of claim 18, wherein the information needed to optimize includes at least one of a received signal strength from neighbor base stations of the base station and an installation location of the base station.

* * * * *